US010869154B2

(12) United States Patent
Bruser et al.

(10) Patent No.: US 10,869,154 B2
(45) Date of Patent: Dec. 15, 2020

(54) LOCATION-BASED PERSONAL AUDIO

(71) Applicant: Bose Corporation, Framingham, MA (US)

(72) Inventors: Ilissa Brooke Bruser, Framingham, MA (US); Maura Elston Cass, Somerville, MA (US); Eric Eugene Dolecki, Holliston, MA (US); Andrew D. Dominijanni, Waltham, MA (US); Shaun Fisher, Natick, MA (US); Andrew Porter Hlynsky, Providence, RI (US); Maya Antara Mukhopadhaya, Brookline, MA (US); Carrie Ann Olson, Upton, MA (US); Naganagouda Patil, Westborough, MA (US); Jason Robinson, Tewksbury, MA (US); Daniel Winchell Tellier, Pepperell, MA (US); Lindsey Turner, Medford, MA (US); Erich Andrew Wiernasz, Somerville, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/267,643

(22) Filed: Feb. 5, 2019

(65) Prior Publication Data
US 2019/0246235 A1 Aug. 8, 2019

Related U.S. Application Data

(60) Provisional application No. 62/626,967, filed on Feb. 6, 2018.

(51) Int. Cl.
*H04S 7/00* (2006.01)
*H04R 5/04* (2006.01)
(Continued)

(52) U.S. Cl.
CPC .............. *H04S 7/304* (2013.01); *G06F 3/012* (2013.01); *G06F 3/017* (2013.01); *G06F 3/165* (2013.01);
(Continued)

(58) Field of Classification Search
CPC .......... H04S 7/304; H04S 7/303; G06F 3/012; G06F 3/017; G06F 3/165; G06F 9/542;
(Continued)

(56) References Cited

U.S. PATENT DOCUMENTS

| 7,526,378 B2 | 4/2009 | Genz | |
| 8,406,791 B1 * | 3/2013 | Daily | ................... H04M 3/493 455/461 |

(Continued)

FOREIGN PATENT DOCUMENTS

| WO | WO-2016090342 A2 * | 6/2016 | ........... G01S 3/8083 |
| WO | 2016157193 A1 | 10/2016 | |

OTHER PUBLICATIONS

Anna Hubbel, "Location, Location, Location: Snap Acquired AR Startup Drop / AdvertiseMint," https://www.advertisemint.com/location-location-location-snap-acquired-ar-startup-drop, Jul. 6, 2017, 2 pages.

(Continued)

*Primary Examiner* — Davetta W Goins
*Assistant Examiner* — Kuassi A Ganmavo
(74) *Attorney, Agent, or Firm* — Hoffman Warnick L.L.C

(57) ABSTRACT

Various implementations include wearable audio devices and related methods for controlling such devices. In some particular implementations, a computer-implemented method of controlling a wearable audio device configured to provide an audio output includes: receiving data indicating the wearable audio device is proximate a geographic location associated with a localized audio message; providing a (Continued)

prompt to initiate playback of the localized audio message to a user of the wearable audio device; and initiating playback of the localized audio message at the wearable audio device in response to actuation of the prompt by the user.

23 Claims, 4 Drawing Sheets

(51) Int. Cl.
*H04R 3/00* (2006.01)
*H04R 5/033* (2006.01)
*G06F 3/01* (2006.01)
*H04R 5/027* (2006.01)
*G06F 9/54* (2006.01)
*G06F 3/16* (2006.01)
*H04R 1/10* (2006.01)
*G06Q 30/02* (2012.01)
*H04L 29/08* (2006.01)

(52) U.S. Cl.
CPC ............ *G06F 9/542* (2013.01); *H04R 3/005* (2013.01); *H04R 5/027* (2013.01); *H04R 5/033* (2013.01); *H04R 5/04* (2013.01); *G06Q 30/0205* (2013.01); *G06Q 30/0251* (2013.01); *G06Q 30/0259* (2013.01); *G06Q 30/0261* (2013.01); *H04L 67/22* (2013.01); *H04R 1/1091* (2013.01); *H04R 2460/07* (2013.01); *H04R 2499/11* (2013.01)

(58) Field of Classification Search
CPC ........ H04R 3/005; H04R 5/027; H04R 5/033; H04M 1/72569; G06Q 30/0261; G06Q 30/0251; H04L 67/22; H04L 29/08936
See application file for complete search history.

(56) References Cited

U.S. PATENT DOCUMENTS

| | | | |
|---|---|---|---|
| 9,628,950 B1 | 4/2017 | Noeth et al. | |
| 9,832,587 B1* | 11/2017 | Park | G10L 15/25 |
| 9,886,954 B1* | 2/2018 | Meacham | G10L 15/063 |
| 10,129,682 B2 | 11/2018 | Mentz | |
| 2003/0031334 A1* | 2/2003 | Layton | H04R 27/00 381/310 |
| 2007/0211872 A1* | 9/2007 | Cai | H04M 3/42093 379/142.01 |
| 2008/0261564 A1* | 10/2008 | Logan | G08B 13/1427 455/413 |
| 2010/0077017 A1* | 3/2010 | Martinez | H04L 67/18 709/201 |
| 2010/0323716 A1* | 12/2010 | Jaffri | G06O 30/0261 455/456.1 |
| 2012/0196571 A1* | 8/2012 | Grkov | H04L 63/14 455/411 |
| 2012/0331093 A1* | 12/2012 | Cartier | G06F 16/9535 709/217 |
| 2013/0177187 A1 | 7/2013 | Mentz | |
| 2013/0178967 A1 | 7/2013 | Mentz | |
| 2013/0194164 A1 | 8/2013 | Sugden et al. | |
| 2014/0133658 A1 | 5/2014 | Mentz et al. | |
| 2014/0164118 A1* | 6/2014 | Polachi | G06Q 30/0259 705/14.57 |
| 2015/0208166 A1 | 7/2015 | Raghuvanshi et al. | |
| 2015/0230022 A1* | 8/2015 | Sakai | H04R 1/1041 381/58 |
| 2015/0316640 A1* | 11/2015 | Jarske | H04S 7/303 381/56 |
| 2015/0382138 A1* | 12/2015 | Bose | H04L 51/10 455/456.3 |
| 2016/0011852 A1 | 1/2016 | Plumb | |
| 2016/0123745 A1 | 5/2016 | Cotier et al. | |
| 2016/0192073 A1* | 6/2016 | Poornachandran | G10L 25/51 381/26 |
| 2016/0286316 A1 | 9/2016 | Bleacher et al. | |
| 2017/0034088 A1* | 2/2017 | Guthery | G10L 15/26 |
| 2018/0095713 A1 | 4/2018 | Rubin et al. | |
| 2018/0094939 A1 | 5/2018 | Holmes | |
| 2018/0173388 A1 | 6/2018 | Holmes et al. | |

OTHER PUBLICATIONS

PCT International Search Report and Written Opinion for International Application No. PCT/US2019/016616, dated Apr. 10, 2019, 15 pages.

* cited by examiner

LOCATION-BASED PERSONAL AUDIO

PRIORITY CLAIM

This application claims priority to U.S. Provisional Patent Application No. 62/626,967, filed on Feb. 6, 2018, which is hereby incorporated by reference in its entirety.

TECHNICAL FIELD

This disclosure generally relates to audio devices. More particularly, the disclosure relates to audio devices, such as wearable audio devices, including a location-based audio module for providing location-specific audio to the user at the wearable audio device.

BACKGROUND

Portable electronic devices, including headphone and other wearable audio systems are becoming more commonplace. However, the user experience with these audio systems is limited by the inability of these systems to adapt to different environments and locations.

SUMMARY

All examples and features mentioned below can be combined in any technically possible way.

Various implementations include wearable audio devices configured to adapt audio output based upon particular location-based conditions, orientation-based conditions or environmental conditions. In other implementations, a computer-implemented method is disclosed for controlling a wearable audio device.

In some particular aspects, a computer-implemented method of controlling a wearable audio device configured to provide an audio output includes: receiving data indicating the wearable audio device is proximate a geographic location associated with a localized audio message; providing a prompt to initiate playback of the localized audio message to a user of the wearable audio device; and initiating playback of the localized audio message at the wearable audio device in response to actuation of the prompt by the user.

In other particular aspects, a wearable audio device includes: an acoustic transducer having a sound-radiating surface for providing an audio output; a position tracking system configured to detect a position of the wearable audio device; and a control system coupled with the acoustic transducer and the position tracking system, the control system configured to: receive position data from the position tracking system indicating the wearable audio device is proximate a geographic location associated with a localized audio message; provide a prompt to initiate playback of the localized audio message to a user of the wearable audio device; and initiate playback of the localized audio message at the wearable audio device in response to actuation of the prompt by the user.

Implementations may include one of the following features, or any combination thereof.

In particular cases, the wearable audio device includes a sensor system. In some cases, the sensor system includes a position tracking system, and the method further includes: selecting the prompt to initiate playback of the localized audio message based upon a position and direction of movement of the wearable audio device; and providing at least one additional prompt to initiate playback of a distinct localized audio message based upon a change in the position or the direction of movement of the wearable audio device. In certain implementations, the position tracking system includes at least one of a global positioning system or an orientation tracking system, and the prompt or the at least one additional prompt is selected based upon at least one of positioning data from the global positioning system or orientation data from the orientation tracking system. In particular cases, the sensor system includes at least one of an accelerometer or a gyroscope, and the method further includes: selecting the prompt to initiate playback of the localized audio message or providing an audio beacon indicating a direction of a distinct localized audio message based upon an acceleration of the wearable audio device or a deceleration of the wearable audio device. In certain implementations, the sensor system includes a microphone, and the method further includes: detecting an ambient audio signal proximate the wearable audio device; and modifying the localized audio message at the wearable audio device based upon the ambient audio signal. In particular cases, detecting the ambient audio signal includes identifying a signature of the ambient audio signal, and modifying the localized audio message includes at least one of increasing a decibel level of the localized audio message, decreasing the decibel level of the localized audio message, or providing an active noise reduction signal at the wearable audio device, based upon the identified signature of the ambient audio signal.

In some implementations, the method further includes initiating playback of an audio beacon associated with the localized audio message based upon at least one of a position or an orientation of the wearable audio device, where the audio beacon is spatialized to indicate at least one of a direction or a proximity of the geographic location associated with the localized audio message. In certain cases, playback of the audio beacon is performed prior to providing the prompt to initiate playback of the localized audio message. In particular implementations, the spatialized audio beacon adjusts at least one audio characteristic thereof based upon a change in the at least one of the position or the orientation of the wearable audio device. In some cases, the method further includes initiating playback of an additional audio beacon associated with an additional localized audio message based upon the change in the at least one of the position or orientation of the wearable audio device. In certain implementations, the additional audio beacon is initiated in a series following initiation of the audio beacon and the localized audio message.

In particular cases, the prompt includes at least one of an audio prompt provided at the wearable audio device, or a visual prompt or a tactile prompt provided at the wearable audio device or at a distinct device on the user.

In certain implementations, actuation of the prompt is detectable by the wearable audio device and includes at least one of a gesture of the user, a tactile actuation by the user or a voice actuation by the user.

In some cases, the localized audio message is only accessible proximate the geographic location. In particular implementations, accessible proximity to the geographic location is adjustable based upon a density of a geographic region or user profile data for at least one of the user or a provider of the localized audio message. In particular cases, the localized audio message is stored in a local network at the geographic location or in a cloud storage system connected with the geographic location.

In some implementations, the localized audio message comprises a song, a pre-recorded message from the user or another user, an audio signature from the user, another user or an information source, or a pre-recorded message from an information source.

In certain cases, the method further includes: prompting the user or another user to record the localized audio message; and saving the localized audio message to a storage device accessible at the wearable audio device after recording the localized audio message. In some implementations, the method further includes: initiating, by the user or another user at the wearable audio device or another audio recording device, a recording of the localized audio message while the user or another user is at a location remote from the geographic location. In some cases, the method further includes initiating, by the user or another user at the wearable audio device or another audio recording device, a recording of the localized audio message while the user or another user is proximate the geographic location. In particular implementations, the method further includes providing a user-selectable setting to either include or exclude ambient audio captured proximate the geographic location during the recording. In certain cases, the wearable audio device includes a plurality of microphones configured to perform binaural recording of the localized audio message proximate the geographic location.

In some implementations, the method further includes receiving user profile data or biometric information about the user, where providing the prompt to initiate playback of the localized audio message is based upon at least one of the user profile data or the biometric information about the user. In particular cases, the user profile data includes settings for audio notifications at the wearable audio device, and at least one of providing the prompt or initiating the playback at the wearable audio device is performed according to the settings.

In certain cases, the method further includes providing a feedback prompt during the playback of the localized audio message or after the playback of the localized audio message, the feedback prompt including at least one option to: refuse the localized audio message, select between distinct localized audio messages, or rate the localized audio message.

In particular implementations, the user is permitted to share the localized audio message with a distinct user located at the geographic location or located at a remote geographic location.

In some cases, the localized audio message is only accessible for a specified period. In certain implementations, the specified period is one of a single period or a recurring period.

In particular implementations, the device includes a sensor system coupled with the control system. In certain cases, the sensor system includes a wireless transceiver configured to detect an audio cache storing the localized audio message proximate the wearable audio device, where the control system is further configured to provide the prompt to initiate playback of the localized audio message in response to the wireless transceiver detecting the audio cache, and the audio cache is stored in a local network at the geographic location or in a cloud storage system connected with the geographic location. In some implementations, the sensor system includes: a motion sensor; a tactile sensor; and a microphone, and actuation of the prompt is detectable by the sensor system, where actuation includes at least one of a gesture of the user detectable by the motion sensor, a tactile actuation by the user detectable at the tactile sensor, or a voice actuation by the user detectable by the microphone.

In certain implementations, the control system is further configured to: prompt the user or another user to record the localized audio message; and save the localized audio message to a storage device accessible at the wearable audio device after recording the localized audio message. In some cases, the control system is further configured to: initiate, in response to actuation by the user or another user at the wearable audio device or another audio recording device, a recording of the localized audio message while the user or another user is at a location remote from the geographic location. In particular implementations, the control system is further configured to: initiate, in response to actuation by the user or another user at the wearable audio device or another audio recording device, a recording of the localized audio message while the user or another user is proximate the geographic location. In certain cases, the control system is further configured to: provide a user-selectable setting to either include or exclude ambient audio captured proximate the geographic location during the recording. In some implementations, the device further includes a plurality of microphones coupled with the control system, the plurality of microphones configured to perform binaural recording of the localized audio message proximate the geographic location.

In additional implementations, the localized audio message includes distinct directionally attributable segments based upon at least one of a direction of approach of the wearable audio device relative to the geographic location or a look direction of the user wearing the wearable audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
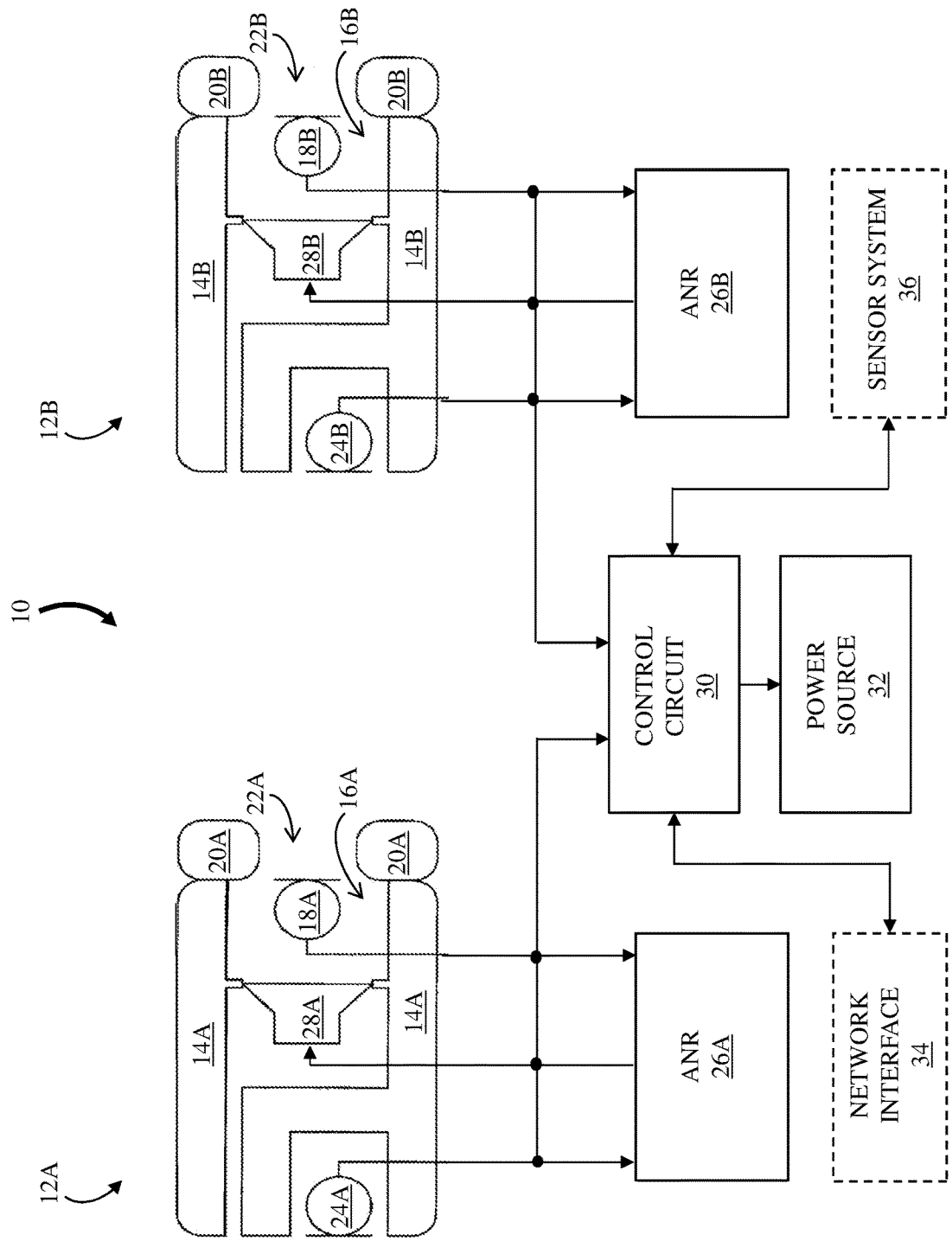
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an audio control system can be beneficially incorporated into a wearable audio device to provide for added functionality. For example, an audio control system can help to enable, among other things, location-based audio playback providing the user with an immersive, dynamic travel experience.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling location-based audio functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling location-based audio processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wirelessly (or hard-wired) sensors for detecting conditions of the environment proximate personal audio device 10 as described herein. As described further herein, sensor system 36 can include a plurality of distinct sensor types for detecting location-based conditions proximate the personal audio device 10.

According to various implementations, the audio playback devices (which may be, for example, personal audio device 10 of FIG. 1) described herein can be configured to provide localized audio messages according to one or more factors. These particular implementations can allow a user to experience dynamic, personalized audio content throughout changing environments, e.g., as a user travels from one location to another location. These implementations can enhance the user experience in comparison to conventional audio systems, e.g., portable audio systems or audio systems spanning distinct environments.

Figure 2:
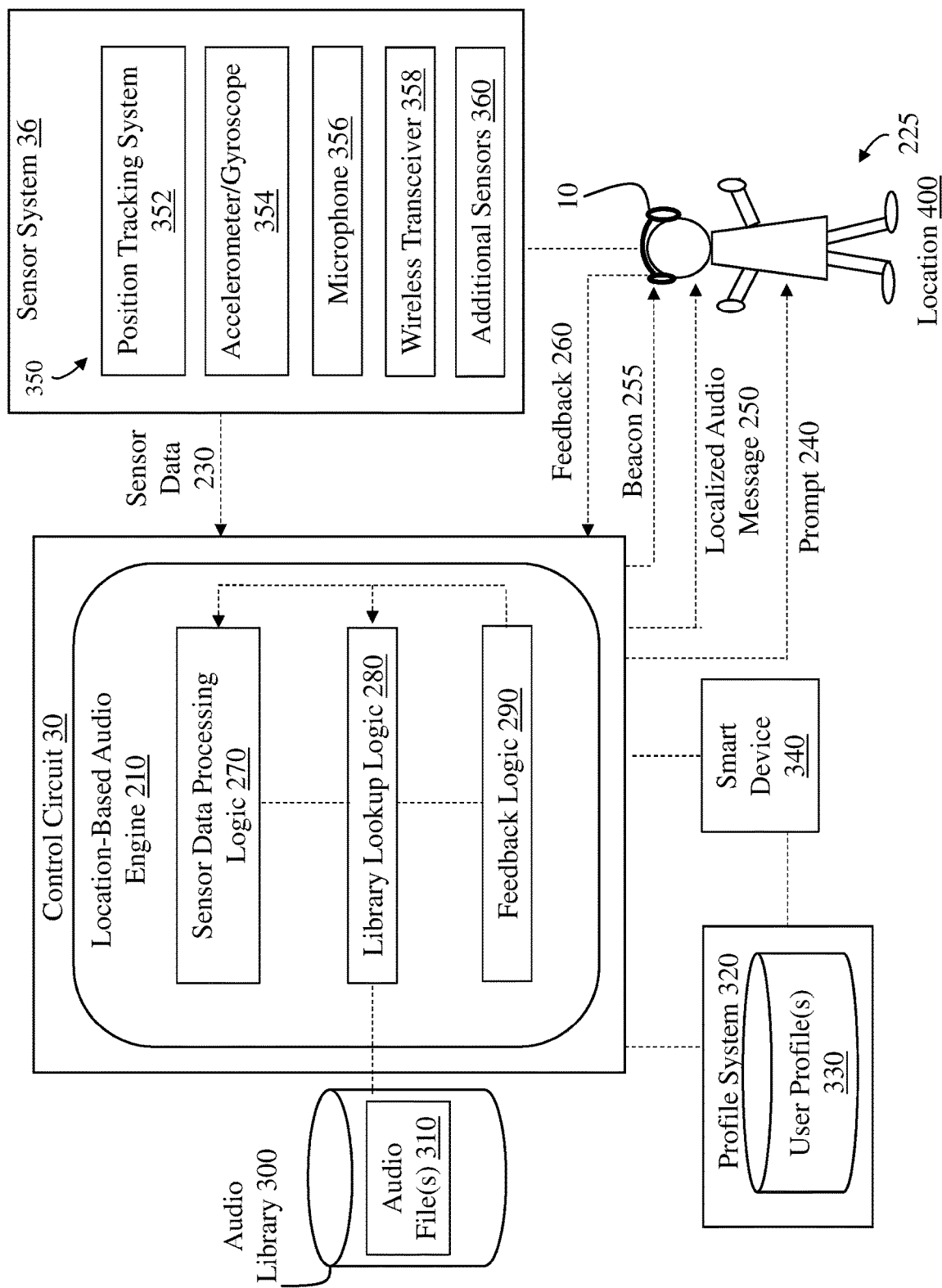
FIG. 2 shows a schematic data flow diagram illustrating control processes performed by a location-based audio engine in the personal audio device of FIG. 1.

As described with respect to FIG. 1, control circuit 30 can execute (and in some cases store) instructions for controlling location-based audio functions in personal audio device 10 and/or other audio playback devices in a network of such devices. As shown in FIG. 2, control circuit 30 can include a location-based audio engine 210 configured to implement modifications in audio outputs at the transducer (e.g., speaker) 28 (FIG. 1) in response to a change in location-based or other conditions. In various particular embodiments, location-based audio engine 210 is configured to receive data about an environmental condition from sensor system 36, and modify the audio output at transducer(s) 28 in response to a change in the environmental condition. In particular implementations, the audio output includes a localized audio message provided at a specific geographic location, or proximate a specific geographic location, which is configured to vary with the change(s) in location and/or environmental condition. In certain cases, the localized audio message can only be provided to the user at or proximate the geographic location, providing an immersive experience at that location.

Figure 3:
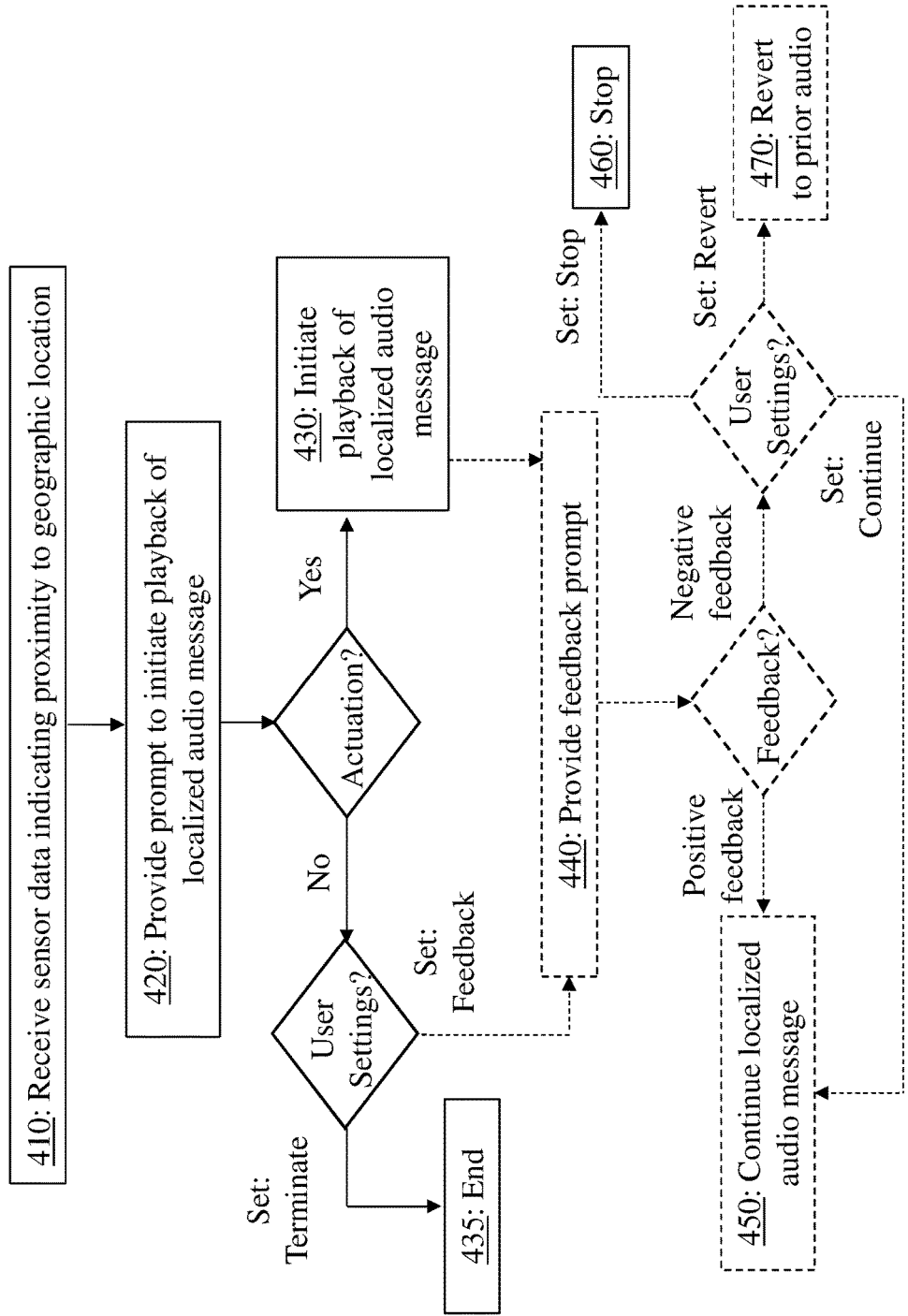
FIG. 3 shows a process flow diagram illustrating processes performed by the location-based audio engine shown in FIG. 2.
Figure 4:
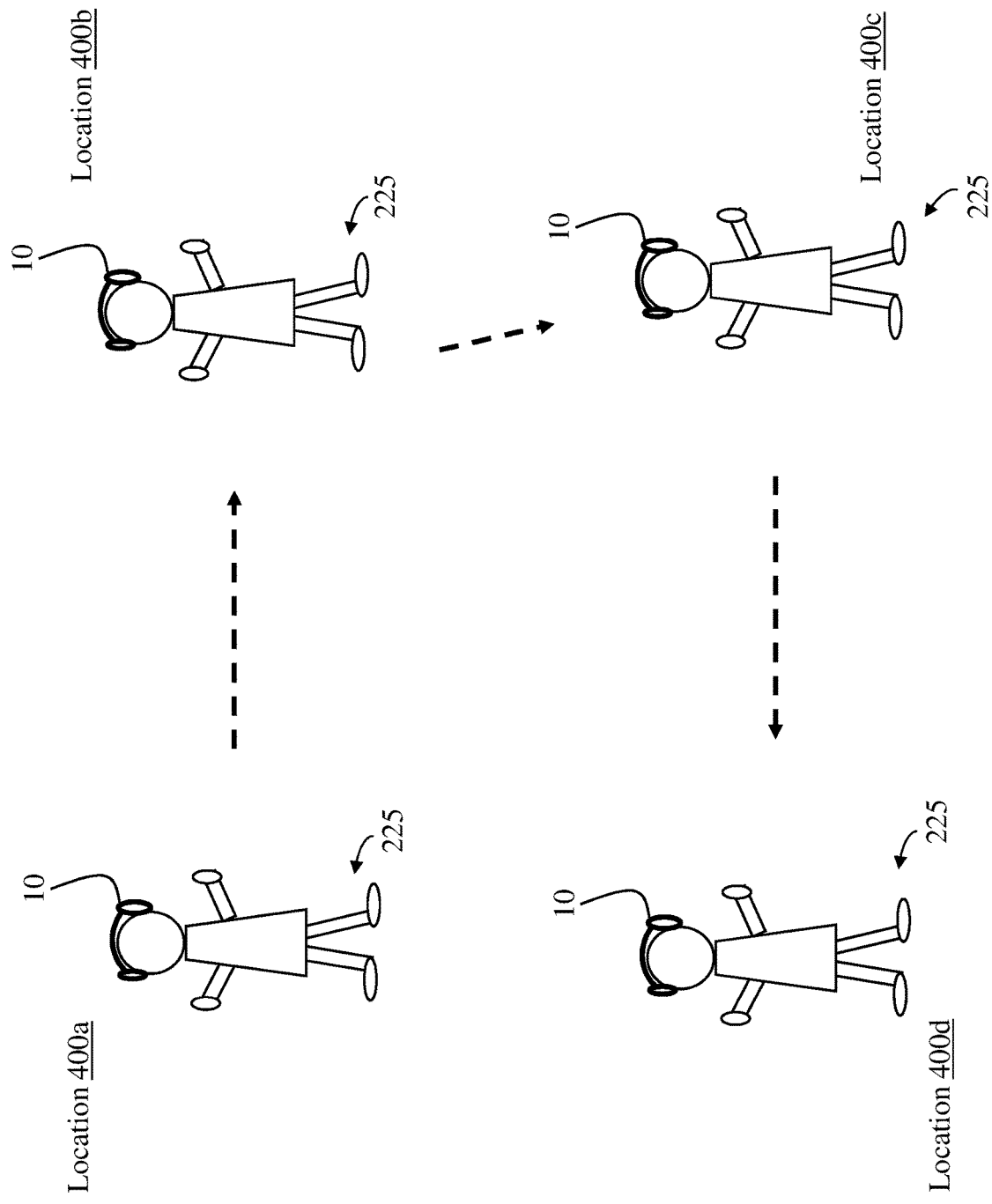
FIG. 4 shows a schematic depiction of a user with the personal audio device of FIGS. 1 and 2 in a plurality of locations.

In particular, FIG. 2 shows a schematic data flow diagram illustrating a control process performed by location-based audio engine 210 in connection with a user 225. It is understood that in various implementations, user 225 can include a human user. FIG. 3 shows a process flow diagram illustrating processes performed by location-based audio engine 210 according to various implementations. FIG. 4 shows a schematic depiction of a user 225 in distinct locations 400a, 400b, 400c, etc. to illustrate example operations of location-based audio engine 210 and personal audio device 10. FIGS. 1-4 are referred to simultaneously, with particular emphasis on FIGS. 2-4.

Returning to FIG. 2, data flows between location-based audio engine 210 and other components in personal audio device 10 are shown. It is understood that one or more components shown in the data flow diagram may be integrated in the same physical housing, e.g., in the housing of personal audio device 10, or may reside in one or more separate physical locations.

According to various implementations, control circuit 30 includes the location-based audio engine 210, or otherwise accesses program code for executing processes performed by location-based audio engine 210 (e.g., via network interface 34). Location-based audio engine 210 can include logic for processing sensor data 230 (e.g., receiving data indicating proximity of personal audio device 10 to a geographic location) from sensor system 36, and providing a prompt 240 to the user 225 to initiate playback of a localized audio message 250 to the user 225 at the personal audio device 10. In various implementations, in response to actuation (e.g., feedback 260) of the prompt 240 by the user 225, the location-based audio engine 210 initiates playback of the localized audio message 250 at the personal audio device 10. In additional implementations, location-based audio engine 210 can provide a beacon 255 to user 225 to indicate a direction of a localized audio message 250 based upon the sensor data 230. In some cases, this logic can include sensor data processing logic 270, library lookup logic 280 and feedback logic 290.

Location-based audio engine 210 can be coupled (e.g., wirelessly and/or via hardwired connections in personal audio device 10) with an audio library 300, which can include audio files 310 for playback (e.g., streaming) at personal audio device 10 and/or a profile system 320 including user profiles 330 about one or more user(s) 225. Audio library 300 can include any library associated with digital audio sources accessible via network interface 34 (FIG. 1) described herein, including locally stored, remotely stored or Internet-based audio libraries. Audio files 310 can additionally include audio pins or caches created by other users, and made accessible according to various functions described herein. User profiles 330 may be user-specific, community-specific, device-specific, location-specific or otherwise associated with a particular entity such as user 225. User profiles 330 can include user-defined playlists of digital music files, audio messages stored by the user 225 or another user, or other audio files available from network audio sources coupled with network interface 34 (FIG. 1), such as network-attached storage (NAS) devices, and/or a DLNA server, which may be accessible to the personal audio device 10 (FIG. 1) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 320 is located in a local server or a cloud-based server, similar to any such server described herein. User profile 330 may include information about frequently played audio files associated with user 225 or other similar users (e.g., those with common audio file listening histories, demographic traits or Internet browsing histories), "liked" or otherwise favored audio files associated with user 225 or other similar users, frequency with which particular audio files are changed by user 225 or other similar users, etc. Profile system 320 can be associated with any community of users, e.g., a social network, subscription-based music service (such as a service providing audio library 255), and may include audio preferences, histories, etc. for user 225 as well as a plurality of other users. In particular implementations, profile system 320 can include user-specific preferences (as profiles 330) for audio messages and/or related notifications (e.g., beacons or beckoning messages). Profiles 330 can be customized according to particular user preferences, or can be shared by users with common attributes.

Location-based audio engine 210 can also be coupled with a smart device 340 that has access to a user profile (e.g., profile 330) or biometric information about user 225. It is understood that smart device 340 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 340 can include a conventional user interface for permitting interaction with user 225, and can include one or more network interfaces for interacting with control circuit 30 and other components in personal audio device 10 (FIG. 1). In some example implementations, smart device 340 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 340 may also be used for: music services setup; browsing of content; setting preset assignments on the audio playback devices; transport control of the audio playback devices; and selecting personal audio devices 10 (or other playback devices) for content playback. Smart device 340 can further include embedded sensors for measuring biometric information about user 225, e.g., travel, sleep or exercise patterns; body temperature; heart rate; or pace of gait (e.g., via accelerometer(s)).

Location-based audio engine 210 is configured to receive sensor data 230 about distinct locations 400a, 400b, 400c, etc. (FIG. 4) from sensor system 36. Sensor data 230 is described herein with reference to the various forms of sensor system 36 configured for sensing such data.

As shown in FIG. 2, sensor system 36 can include one or more of the following sensors 350: a position tracking system 352; an accelerometer/gyroscope 354; a microphone (e.g., including one or more microphones) 356 (which may include or work in concert with microphones 18 and/or 24); and a wireless transceiver 358. These sensors are merely examples of sensor types that may be employed according to various implementations. It is further understood that sensor system 36 can deploy these sensors in distinct locations and distinct sub-components in order to detect particular environmental information relevant to user 225.

The position tracking system 352 can include one or more location-based detection systems such as a global positioning system (GPS) location system, a Wi-Fi location system, an infra-red (IR) location system, a Bluetooth beacon system, etc. In various additional implementations, the position tracking system 352 can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope or radar) for detecting a direction in which the user 225 is facing, as well as movement of the user 225 and the personal audio device 10. Position tracking system 352 can be configured to detect changes in the physical location of the personal audio device 10 and/or user 225 (where user 225 is separated from personal audio device 10) and provide updated sensor data 230 to the location-based audio engine 210 in order to indicate a change in the location 400, 400*b*, 400*c*, of user 225. Position tracking system 352 can also be configured to detect the orientation of the user 225, e.g., a direction of the user's head, or a change in the user's orientation such as a turning of the torso or an about-face movement. In some example implementations, this position tracking system 352 can detect that user 225 has moved proximate a location 400 with a localized audio message 250, or that the user 225 is looking in the direction of a location 400 with a localized audio message 250. In particular example implementations, the position tracking system 352 can utilize one or more location systems and/or orientation systems to determine the location and/or orientation of the user 225, e.g., relying upon a GPS location system for general location information and an IR location system for more precise location information, while utilizing a head or body-tracking system to detect a direction of the user's viewpoint. In any case, position tracking system 352 can provide sensor data 230 to the location-based audio engine 210 about the position (e.g., location and/or orientation) of the user 225.

The accelerometer/gyroscope 354 can include distinct accelerometer components and gyroscope components, or could be collectively housed in a single sensor component. This component may be used to sense gestures based on movement of the user's body (e.g., head, torso, limbs) while the user is wearing the personal audio device 10 or interacting with another device (e.g., smart device 340) connected with personal audio device 10. As with any sensor in sensor system 36, accelerometer/gyroscope 354 may be housed within personal audio device 10 or in another device connected to the personal audio device 10. In some example implementations, the accelerometer/gyroscope 354 can detect an acceleration of the user 225 and/or personal audio device 10 or a deceleration of the user 225 and/or personal audio device 10.

The microphone 356 (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone 356 may include or otherwise utilize microphones 18 and 24 to perform functions described herein. Microphone 356 can be positioned to receive ambient audio signals (e.g., audio signals proximate personal audio device 10). In some cases, these ambient audio signals include speech/voice input from user 225 to enable voice control functionality. In some other example implementations, the microphone 356 can detect the voice of user 225 and/or of other users proximate to or interacting with user 225. In particular implementations, location-based audio engine 210 is configured to analyze one or more voice commands from user 225 (via microphone 356), and modify the localized audio message 250 based upon that command. In some cases, the microphone 356 can permit the user 225 to record a localized audio message 250 for later playback at the location 400*a*, 400*b*, 400*c*, etc., by the user 225 or another user. In various particular implementations, the location-based audio engine 210 can permit the user 225 to record a localized audio message 250 to either include or exclude ambient sound (e.g., controlling ANR during recording), based upon the user preferences. In some examples, user 225 can provide a voice command to the location-based audio engine 210 via the microphone 356, e.g., to control playback of the localized audio message 250. In these cases, sensor data processing logic 270 can include logic for analyzing voice commands, including, e.g., natural language processing (NLP) logic or other similar logic.

Returning to sensor system 36, wireless transceiver 358 (comprising a transmitter and a receiver) can include, for example, a Bluetooth (BT) or Bluetooth Low Energy (BTLE) transceiver or other conventional transceiver device, and may be configured to communicate with other transceiver devices in distinct locations 400*a*, 400*b*, 400*c*, etc. (FIG. 4). In some example implementations, wireless transceiver 358 can be configured to detect an audio message (e.g., an audio message 250 such as an audio cache or pin) proximate personal audio device 10, e.g., in a local network at a geographic location or in a cloud storage system connected with the geographic location 400. For example, another user, a business establishment, government entity, tour group, etc. could leave an audio message 250 (e.g., a song; a pre-recorded message; an audio signature from: the user, another user, or an information source; an advertisement; or a notification) at particular geographic (or virtual) locations, and wireless transceiver 358 can be configured to detect this cache and prompt user 225 to initiate playback of the audio message.

As noted herein, in various implementations, the localized audio message 250 can include a pre-recorded message, a song, or an advertisement. However, in other implementations, the localized audio message can include an audio signature such as a sound, tone, line of music or a catch phrase associated with the location at which the audio message 250 is placed and/or the entity (e.g., user, information source, business) leaving the audio message 250. In some cases, the localized audio message 250 can include a signature akin to an "audio emoji", which identifies that localized audio message 250, e.g., as an introduction and/or closing to the message. In these examples, an entity could have a signature tone or series of tones indicating the identity of that entity, which can be played before and/or after the content of the localized audio message 250. These audio signatures can be provided to the user 225 (e.g., by location-based audio engine 210) generating the localized audio message 250 as standard options, or could be customizable for each user 225. In some additional cases, the localized audio message 250 can be editable by the user 225 generating that message. For example, the user 225 generating a localized audio message 250 can be provided with options to apply audio filters and/or other effects such as noise suppression and/or compression to edit the localized message 250 prior to making that localized message 250 available (or, "publishing") to other user(s) 225 via the location-based audio engine 210. Additionally, the localized audio message 250 can enable playback control (e.g., via location-based audio engine 210), permitting the listening user 225 to control audio playback characteristics such as rewind, fast-forward, skip, accelerated playback (e.g., double-time), etc.

In particular example implementations, the user 225 can "drop" a localized audio message 250 such as a pin when that user 225 is physically present at the geographic location 400. For example, the user 225 can share a live audio recording, sampled using microphone 356 or another microphone to provide a snapshot of the audio at that location 400. This localized audio message 250 can then be associated (linked) with the geographic location 400 and made available to the user 225 or other users at a given time (or for a particular duration) when those users are also proximate the geographic location 400. In other example, the localized audio message 250 can be generated from a remote location (e.g., 400b, 400c, 400d), that is, a location distinct from the geographic location (e.g., 400a) associated with the localized audio message 250. In these cases, the provider of the localized audio message 250 can link that message 250 with the geographic location (e.g., 400a) via the location-based audio engine 210, such as through a mobile application or PC-based application of this engine 210. As described herein, access to localized audio message(s) 250 and creation of such message(s) 250 can be tailored to various user and group preferences. However, according to various implementations, the localized audio message 250 is only accessible to a user 225 that is proximate the geographic location associated with that message 250, e.g., a user 225 physically located within the proximity of the geographic location.

It is understood that any number of additional sensors 360 could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

As noted herein, location-based audio engine 210 can include logic for performing audio control functions according to various implementations. FIG. 3 shows a flow diagram illustrating processes in location-based audio control performed by location-based audio engine 210 and its associated logic. FIG. 4 illustrates a single user 225 in distinct physical locations 400a, 400b, 400c and 400d. In some cases, the physical locations 400a, 400b, 400c, and 400d can be related, e.g., successive physical locations on a walking tour, commute to work, multi-city vacation or otherwise connected locations relative to the user 225. However, the physical locations 400a, 400b, 400c, and 400d need not be related in any manner. FIG. 3 is referred to concurrently with FIG. 2.

Turning to the process flow in FIG. 3, location-based audio engine 210 receives sensor data 230 from sensor system 36 (process 410, FIG. 3) indicating that the personalized audio device (or simply, audio device) 10 is proximate a geographic location associated with a localized audio message 250. Based upon that sensor data 230, location-based audio engine 210 provides a prompt 240 to initiate playback of the localized audio message 250 at audio device 10 (process 420, FIG. 3). The location-based audio engine 210 can initiate playback of the localized audio message 250 in response to actuation of the prompt 240 by the user 225 (process 430, FIG. 3). If the user 225 does not actuate the prompt 240, in some implementations based upon user settings (Set: Terminate), the location-based audio engine 210 can terminate the prompt (end), e.g., after a timeout period or when user 225 leaves the geographic location 400 (process 435, FIG. 3). In other cases, user settings are set (Set: Feedback) to provide a feedback prompt (e.g., in a similar manner as prompt 240 to initiate playback, or via another prompt approach described herein) to elicit feedback 260 about the localized audio message 250, method of notification, or general notification settings (process 440, FIG. 3, illustrated as optional in dashed lines). Additionally, this feedback 260 can be elicited during or after playback of the localized audio message 250, even in the case that the user 225 actuates the prompt 240 and initiates playback of that message 250. The feedback from user 225 can be treated according to user settings or default settings for the location-based audio engine 210. For example, in some cases, the location-based audio engine 210 can continue playing the localized audio message 250 in response to positive feedback from the feedback prompt (process 450, FIG. 3). In these cases, where the user 225 provides negative feedback relative to the feedback prompt, the location-based audio engine 210 can check user settings (e.g., in user profile(s) 330) and take corresponding action. For example, user settings can indicate that negative feedback should continue play of the localized audio message 250 (process 450, FIG. 3). In other instances, user settings can indicate that negative feedback should trigger a halt (stop) of the localized audio message 250, or revert back to a prior audio output (e.g., audio output that was interrupted by localized audio message) (process 460, FIG. 3).

As noted herein, sensor data 230 can include data about one or more location-based or environmental conditions detected by sensor system 36, and may include data about a plurality of environmental conditions. For example, sensor data 230 can include data about a position and/or orientation of the personal audio device 10 (e.g., from position tracking system 352) data about an acceleration of personal audio device 10 (e.g., from accelerometer/gyroscope 354), data about the ambient audio conditions proximate personal audio device 10 (e.g., from microphone 356) or data about nearby audio, video or other data caches (e.g., from wireless transceiver 358).

Returning to FIG. 2, in various implementations, sensor data processing logic 270 is configured to process the sensor data 230 and provide a weighted localized representation to library lookup logic 280 to enable fetching a type of audio file 310 for providing in the localized audio message 250. That is, sensor data processing logic 270 can include weightings or factoring for one or more of user preferences (e.g., user profile(s) 330), sensor data about past events (e.g., position and/or acceleration information about personal audio device 10 over given periods), audio files (e.g., audio samples of user's voices, or audio signatures such as ambient audio signatures, as sampled by microphone 356), and other readily available data (e.g., a demographic profile of a plurality of users with at least one common attribute with the user 225 or a categorical popularity of an audio file 310). The weighted localized representation may indicate a general characteristic of the location 400a, 400b, 400c, etc., as a combination of factors from sensor data 230, profile(s) 330 and/or information from smart device 340.

After processing the sensor data 230 with sensor data processing logic 270, library lookup logic 280 can search audio library 300 for audio files 310 using the weighted localized representation from sensor data processing logic 270. Library lookup logic 280 may include a relational database with relationships between the weighted localized representation and audio files 310. As noted herein, audio library 300 can be locally stored at personal audio system 10, smart device 340, (FIG. 1) and/or stored at one or more remote or cloud-based servers. Library lookup logic 280 can be continually updated based upon changes in audio library 300 in order to provide accurate, timely associations between the weighted localized representation from sensor data processing logic 270 and audio files 310. In various implementations, as noted herein, the localized audio message 250 is selected based upon a proximity of the personal audio device 10 to a particular geographic location 400. The library lookup logic 280 can utilize the weighted localized representation to determine which, if any, localized audio message(s) 250 should be provided to the user 225 (e.g., via prompt 240 and related processes) according to the user profile 330 and/or proximity to geographic locations 400. For example, the library lookup logic 280 can be configured to select a localized audio message 250 from the audio files 310 when the user 225 is moving between locations 400a, 400b, 400c, etc., as well as when the user 225 approaches a location, leaves a location, or turns toward or away from a location. Additionally, as discussed herein, library lookup logic 280 can be configured to select a beacon 255 to direct the user 225 to one or more localized audio message(s) 250 based upon the weighted localized representation.

In some example implementations, location-based audio engine 210 (e.g., using sensor data processing logic 270 and/or library lookup logic 280) is configured to perform one or more of the following logic processes using sensor data 230 and/or other data accessible via profile system 320, smart device 340, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

In some implementations, location-based audio engine 210 is configured to work in concert with sensor system 36 to continually monitor changes in one or more environmental conditions. In some cases, sensor system 36 may be set in an active mode, such as where position tracking system 352 pings nearby Wi-Fi networks to triangulate location of the personal audio device 10, or microphone 356 (or microphones 18 and/or 24) remains in a "listen" mode for particular ambient sounds. In other implementations, sensor system 36 and location-based audio engine 210 can be configured in a passive mode, such as where wireless transceiver 358 detects signals transmitted from nearby transceiver devices or network devices. In still other implementations, distinct sensors in the sensor system 36 can be set in distinct modes for detecting changes in environmental conditions and transmitting updated sensor data 230 to location-based audio engine 210. For example, some sensors in sensor system 36 can remain in an active mode while audio device 10 is active (e.g., powered on), while other sensors may remain in a passive mode for triggering by an event.

The weighted localized representation calculated based upon the sensor data 230 can be used to select the appropriate localized audio message 250 for playback at the audio device 10. In various implementations, the geographic location 400 is defined according to at least one of a geofence, a local area network, a Bluetooth network, a cellular network, or a global positioning system (GPS), though other techniques may be used. According to particular implementations, the range of detection or actuation of the localized audio message 250, is defined at the time of generation of that localized audio message 250. In particular cases, the range is defined as a radius surrounding the location 400 of the localized audio message 250. However, the range can be defined according to any variety of shapes and/or sizes. For example, the range can take the form of a radius such as a circle or other polygon shape (e.g., square, rectangle, triangle) surrounding the location 400. In some cases, the user 225 can define the range (or, radius) of the localized audio message 250 at the time of generation. In certain implementations, the radius can be centered on the location 400 of the localized audio message 250 or a point of interest. However, in other cases, the center of the radius around location 400 can be shifted by the generating user 225. Additionally, localized audio message(s) 250 can be placed at locations which are distinct from the subject of the localized audio message 250. In one example, a business located on the corner of a busy, urban intersection may prefer that its localized audio message 250 be located across the street from the business in order to capture more visitors and/or interest. In other cases, the radius can be shifted to account for a higher density of potential users 225, e.g., where a location 400 is proximate a natural barrier such as a body of water or major roadway, and users 225 are likely to be located on one side of that barrier. In various implementations, the location-based audio engine 210 can generate a weighted localized representation based upon a proximity to one or more of these indicators of geographic location. In some cases, the location-based audio engine 210 utilizes user-specific or environment-specific criteria to define "proximity" to the geographic location 400. For example, sensor data 230 can indicate that a user 225 is located within a one-block radius of a localized audio message 250, but that additional localized audio messages 250 are also within one block of the user 225. The location-based audio engine 210 could rely more heavily upon data from sensors having a higher degree of certainty (e.g., via weighting) to determine a closest localized audio message 250.

In other cases, the location-based audio engine 210 can include a radius setting for determining access to prompts 240 and associated localized audio messages 250. That is, the accessible proximity to the geographic location 400 (e.g., range in which a prompt 240 will be sent, and a localized audio message 250 can be received) can be adjustable according to various implementations. In some particular aspects, the accessible proximity to the geographic location 400 is adjustable based upon a density of a geographic region, such as the population density of a region or the localized audio message density of a region. In other aspects, the accessible proximity to the geographic location 400 is adjustable based upon user profile data (in user profile(s) 330) of the user 225 or the provider of the localized audio message 250. In these examples, the user 225 could define an accessible proximity in order to avoid over-stimulation from prompts 240 in a region with a high density of localized audio messages 250, or to avoid a message "desert", where localized audio messages 250 are separated by significant distances. Additionally, the provider of the localized audio message 250 can define the proximity to the geographic location. This scenario could be useful for an advertiser or proprietor looking to draw users 225 toward a particular location, such as with localized audio message(s) 250 about product sales, time-sensitive offers, or events. In other implementations, default settings or common settings can be used to define the proximity to a geographic location of the localized audio message 250. In still other implementations, a provider of the localized audio message(s) 250 can adjust the accessible radius of those messages 250, and in particular cases, could provide payment or other crediting to expand or contract that radius.

As described herein, the location-based audio engine 210 can utilize sensor data 230 from the sensor system 36 to make decisions about providing prompts 240 and playback of related localized audio message(s) 250 at the audio device 10. In some particular examples, the sensor types (and associated sensor data 230) can dictate decisions about the prompts 240 and audio messages 250. For example, in the case of the position tracking system 352, the location-based audio engine 210 can be configured to select the prompt 240 to initiate playback of the localized audio message 250 based upon both a position and a direction of movement of the audio device 10. Additionally, in some cases, the location-based audio engine 210 can provide at least one additional prompt 240 to initiate playback of a distinct localized audio message 250 based upon a change in the position or direction of movement of the audio device 10. As noted herein, the position tracking system 352 can include a location system and an orientation system, and the prompt(s) 240 (and associated audio message(s) 250) can be selected based upon positioning data and/or orientation data from that position tracking system 352. For example, as a user 225 moves between locations 400a, 400b, etc. having distinct localized audio messages 250 and/or looks in the direction of locations 400a, 400b, etc. having distinct audio messages 250, the location-based audio engine 210 can provide an additional prompt 240 to initiate playback of a distinct localized audio message 250 associated with those locations 400a, 400b, etc. In some cases, the user 225 is presented with a plurality of prompts 240 at a given time, such as a prompt 240 provided on any interface described herein. However, in other cases, the user 225 is presented with a single, most relevant prompt 240 as determined by the location-based audio engine 210 according to the sensor data processing logic 270 and library lookup logic 280.

In other cases, selecting the prompt(s) 240 (and associated audio message(s) 250) is performed based upon an acceleration or deceleration of the audio device as detected by the accelerometer/gyroscope 354. Similarly to location and orientation, acceleration/deceleration can be used to determine which location(s) 400 a user 225 is moving toward/away, and at which rate that user 225 is moving. For example, the sensor data 230 from accelerometer/gyroscope 354 can be used to determine that user 225 is accelerating toward a particular location 400, and present one or more prompts 240 to the user 225 to initiate playback of a localized audio message 250.

In additional implementations, the microphone 356 can be utilized to detect ambient audio signals proximate the audio device 10. The location-based audio engine 210 can be configured to modify the localized audio message 250 at the audio device 10 based upon that ambient audio signal. For example, the location-based audio engine 210 can be configured, based upon default settings, user-defined settings, message-provider preferences, etc., to modify the localized audio message 250 according to the ambient audio signal received at the microphone 356. In some cases, the location-based audio engine 210 can be configured to identify a signature of the ambient audio signal and modify the localized audio message 250 based upon that identified signature. For example, location-based audio engine 210 can increase the decibel level of the localized audio message 250, decrease the decibel level of the localized audio message 250 or provide an active noise reduction signal at the audio device 10 based upon the identified signature. In some particular examples, the location-based audio engine 210 can detect the signature of distant voices, such crowd noise, and increase the decibel level of the localized audio message 250 and/or provide an active noise reduction signal at the audio device 10 to enhance the user's ability to hear the localized audio message 250. In other examples, the location-based audio engine 210 can detect the signature of an ambulance siren, large vehicle such as a train or truck, or an alarm, and decrease the decibel level of the localized audio message 250 to enhance the user's ability to hear the ambient audio signal.

As described herein, the prompt 240 can include an audio prompt provided at the audio device 10, and/or a visual prompt or tactile/haptic prompt provided at the audio device 10 or a distinct device (e.g., smart device 340). In some cases, the audio prompt can include a phrase such as, "Would you like to hear an audio message from source X," or "Audio message available at location Y," or, "Take action Z to initiate an audio message." These are merely examples of audio prompts, and any suitable audio prompt could be used to elicit actuation by the user 225. In other cases, a visual prompt can be provided, e.g., on a smart device 340 or at the audio device 10 (e.g., at a user interface) which indicates that a localized audio message 250 is available. The visual prompt could include an actuatable button, a text message, a symbol, highlighting/lowlighting, or any other visual indicator capable of display on the audio device 10 and/or the smart device 340. A tactile/haptic prompt can include, e.g., a vibration or change in texture or surface roughness, and can be presented at the audio device 10 and/or smart device 340. This tactile/haptic prompt could be specific to the location-based audio engine 210, such that the tactile/haptic prompt is a signature which indicates the localized audio message 250 is available. As the tactile/haptic prompt may provide less information about the underlying content offered, distinct tactile/haptic prompts could be used to reflect priority, e.g., based upon user profile(s) 330 or other settings.

In some particular implementations, actuation of the prompt 240 can be detectable by the audio device 10, and can include a gesture, tactile actuation and/or voice actuation by user 225. For example, user 225 can initiate a head nod or shake to indicate a "yes" or "no" response to a prompt 240, which is detected using a head tracker in the position tracking system 352. In other examples, user 225 can move toward a location 400 to actuate the prompt 240 associated with that location 400 and initiate the localized audio message 250. This movement can be detected by the position tracking system 352 and/or the accelerometer/gyroscope 354. In additional implementations, the user 225 can tap a specific surface (e.g., a capacitive touch interface) on the audio device 10 to actuate the prompt 240, or can tap or otherwise contact any surface of the audio device 10 to initiate a tactile actuation (e.g., via detectable vibration or movement at position tracking system 352 and/or accelerometer/gyroscope 354). In still other implementations, user 225 can speak into microphone 356 or other microphone(s) at audio device 10 to actuate the prompt 240 and initiate a localized audio message 250.

In some other implementations, actuation of the prompt 240 is detectable by the smart device 340, such as by a touch screen, vibrations sensor, microphone or other sensor on the smart device 340. In certain cases, the prompt 240 can be actuated on either the audio device 10 or the smart device 340, regardless of the source of the prompt 240. In other implementations, the prompt 240 is only actuatable on the device from which it is presented. Actuation on the smart device 340 can be performed in a similar manner as described with respect to audio device 10, or can be performed in a manner specific to the smart device 340.

As noted herein, in various particular implementations, the localized audio message 250 is only accessible to a user 225 who is proximate the geographic location 400. In this sense, the user-defined, provider-defined or default setting-defined proximity to the localized audio message 250 can control which user(s) 225 have access to the message 250 (and thus, receive a prompt 240 to play the message 250). Additionally, access to the localized audio message 250 can be controlled by user preferences, e.g., saved in user profile(s) 330. These preferences can allow the user 225 to "follow" particular message providers or "subscribe" to particular providers or types of messages, similarly to following a friend, social media personality or organization on a conventional social media application, and receive prompts 240 to play localized audio messages 250 when the user 225 is located proximate a geographic location 400 where that message provider has left a localized audio message 250. Additionally, a message provider could provide access to a localized audio message 250 using an access list (e.g., stored in profile system 320). In some examples, a message provider could provide a user-specific audio message 250, which can only be accessed by a single user 225 or a single group of users 225. The provider and user(s) 225 can be linked using an application such as the location-based audio engine 210, e.g., by downloading or otherwise accessing the location-based audio engine 210 and linking the provider and user(s) 225 via the engine 210.

In some cases, the localized audio message 250 is only accessible to the user 225 (or group of users 225) for a specified period. The specified period can include a single period, or, a recurring period. In some implementations, the period can be user-defined, default settings-defined and/or provider-defined. For example, the user 225 may define a profile setting in user profile 330 such that only recently provided localized audio messages 250 are accessible, such as those provided within a matter of hours, days, etc. In other cases, the default settings in location-based audio engine 210 can include a timeout clock for removing stale messages, e.g., localized audio messages 250 over a certain number of hours, days or years old. Additionally, providers can define a period in which their localized audio messages 250 are accessible, e.g., where the provider is a retailer, those messages 250 are accessible only during store hours. Recurring periods can be useful for both users 225 and providers. For example, the user 225 can define a recurring period as non-working hours or during a lunch break, when the user 225 is interested and available to receive prompts 240 to hear localized audio messages 250. A provider, such as a restaurant or bar, could provide a recurring localized message to advertise a lunch special or a happy hour special. In some cases, localized audio message(s) 250 could have a limited number of playbacks (or, "trips"), such that a localized audio message 250 has an exclusive characteristic. In one example, the localized audio message 250 can only be tripped by the first X number of users 225 to trigger the message 250.

In some cases, the user 225 can share the localized audio message 250 with a distinct user at the geographic location 400. For example, the user 225 can share the audio file 310 containing the localized audio message 250 via the location-based audio engine 210 and/or a localized file sharing approach. In additional implementations, the user 225 can share the localized audio message 250 with an additional user at a distinct geographic location (e.g., locations 400b or 400c). In these cases, the user 225 may grant special permission to the additional user at the distinct location, or may define settings (e.g., settings in user profile 330) which allow sharing of localized audio messages 250 with other users. In an example implementation, a user 225 can share the audio experience of a particular location 400 with other users who cannot be present at that location 400. In some cases, the user 225 can trade audio files 310 with other users. For example, a user 225 could trade access to an audio file 310 with another user 225 who would not otherwise have access to that audio file 310, and may receive access to another audio file 310 that he/she would not be able to otherwise access. This trading approach may be utilized, e.g., in the case of exclusive localized audio messages 250.

With continuing reference to FIGS. 1 and 2, after library lookup logic 280 selects the audio file 310, that audio stream is provided (i.e., rendered) at transducer 28 (FIG. 1) as part of a localized audio message 250 or a beacon 255. In some examples, localized audio message 250 and/or beacon 255 is configured to transition between audio files 310 in a fade-out/fade-in format, but in some other implementations, the transition between audio files 310 can be abrupt. In other implementations, the localized audio message 250 can include an introduction to an audio file 310 (e.g., the beginning of a message, song or other audio feed (e.g., a sporting event broadcast, an audio file of a movie, interview, documentary, educational programming, etc.), or a portion of such a message, song or other audio file 310 selected to represent that song or audio file 310 (e.g., the chorus of a song)).

As noted herein, various implementations can utilize a beacon 255 to direct the user 225 toward (or away from) a particular location 400. In some cases, location-based audio engine 210 is configured to initiate playback of an audio beacon 255 associated with a localized audio message 250 based upon a position and/or orientation of the audio device 10. That is, in some example implementations, a location-based audio beacon 210 can detect the position and/or orientation of the audio device 10 (e.g., using position tracking system 352 and/or accelerometer/gyroscope 354) and provide an audio beacon 255 (e.g., an audio file 310 selected from audio library 300) to draw the user's attention toward a location 400. In various implementations, the audio beacon 255 includes an audio file or stream associated in some way with the location 400, and can be spatialized to indicate a direction and/or proximity of the geographic location 400 associated with the localized audio message 250. In some particular cases, the audio beacon 255 is provided to the user 225 at audio device 10 prior to a prompt 240 to initiate playback of the localized audio message 250. That is, in some cases, the audio beacon 255 is provided to the user 225 when that user is not necessarily proximate the location 400, but is within a nearby radius or has a particular setting (e.g., in user profile 330) indicating a preference for nearby audio beacon(s) 255. The audio beacon 255 can be associated with the localized audio message 250, such that these messages are linked. In some cases, the audio beacon 255 and the localized audio message 250 can be provided by the same source or associated sources. In additional implementations, the audio beacon 255 is not necessarily associated with the localized audio message 250. For example, a standardized audio beacon 255 could be linked to a localized audio message 250 and have spatialized tones or other audio to direct the user 225 to the audio beacon 255. In various implementations, the audio beacon 255 can have a variable range, which may depend upon the type of linked localized audio message 250, density of the surrounding area (e.g., in terms of population and/or other localized audio messages 250), and/or the rate of travel of the user 225. For example, the radius of a business' localized audio message 250 in a dense urban area could be several miles, while the radius of a personal localized audio message 250 left for another user at the grocery store could be several feet.

In particular cases, the audio beacon 255 is spatialized to adjust at least one audio characteristic based upon a change in at least one of the position or the orientation of the audio device 10. That is, the audio beacon 255 can provide directionality using decibel level, fading, ANR or other techniques described herein to draw the user 225 toward the beacon 255 with sound. Additionally, the audio beacon 255 can provide directionality by adjusting the content and/or speed of the playback of that beacon 255 as the user 225 moves toward or away from the location of the localized audio message 250. The audio beacon 255 can be configured to modify these directional characteristics to progressively beckon the user 225, e.g., by increasing decibel level as the user 225 approaches the location 400, or modifying binaural characteristics to indicate a direction of the location 400 relative to the user's current head or body orientation and/or direction of movement. In various implementations, beacons 255 do not prompt the user 225 for actuation. In other cases, beacons 255 can be actuated according to any actuation approach described herein. Additionally, beacons 255 can be controlled by user profile settings in user profile 330 in order to enhance the user experience, e.g., by disabling beacons 255 when certain audio messages 250 are playing, or enabling beacons 255 for particular providers.

In particular examples, the location-based audio engine 210 can provide a plurality of beacons 255 to the user 225 as the user 225 travels between locations 400a, 400b, 400c, etc. That is, the location-based audio engine 210 can initiate playback of at least one additional audio beacon 255 associated with an additional localized audio message 250 based upon a change in the position and/or orientation of the audio device 10. In some cases, the beacons 255 are related in a series, e.g., an additional beacon 255 is provided after a first localized audio message 250 is initiated to lead the user 225 along a route. In such cases, the beacons 255 can be utilized in a travel tour, maze, for gaming, or for other expeditions involving multiple points of interest. A user 225 could also be presented with multiple beacons 255 at a given junction (e.g., a crossroads) based upon that user's interests as defined by profile 330 and/or entities followed via a linked social medial application.

In some examples, a beacon 255 could draw a user 225 toward a location of a popular attraction (e.g., the Eiffel Tower), along a popular travel route (e.g., the Freedom Trail in Boston, Mass.), or toward a localized audio message 250 left by a celebrity or athlete at a nearby location 400. In a particular example, a musical artist could provide one or more localized audio messages 250 in a city, with associated beacons 255 leading to the location of a concert or a record store selling the artist's new album. In other cases, a poet could provide one or more localized audio messages 250 with associated beacons 255 leading along the path that inspired the poet's seminal poem.

As noted herein, localized audio messages 250 (and associated beacons 255) can take a variety of forms. In particular implementations, localized audio messages 250 include locally recorded audio snapshots at the location 400, and/or remotely originated audio files (or streams). These localized audio messages 250 can include voice, music, ambient sound, noise, etc., and may be editable or re-recordable by the user 225 engaging the location-based audio engine 210. In certain cases, the user 225 can provide a localized audio message 250 for himself/herself, however, in other cases, the user 225 can provide a localized audio message for another user.

In particular implementations, the location-based audio engine 210 can be configured to prompt a user 225 to record a localized audio message 250, and save the localized audio message to a storage device (e.g., audio library 300) accessible at a wearable audio device 10 after recording. In some cases, the location-based audio engine 210 can be utilized with a mobile application, such as an application accessible on the audio device 10 or the smart device 340, and can provide an actuatable mechanism (e.g., an interface control, audio control or tactile control) for triggering recording of the localized audio message 250. The user 225 or another user can use the microphone 356 or other microphones described herein (e.g., on smart device 340) to record the localized audio message 250. In some cases, the user 225 or another user can initiate recording of the localized audio message 250 at the location 400 associated with that message 250 (e.g., on the sidewalk outside a point of interest). According to some example implementations, the location-based audio engine 210 can provide a user-selectable setting for either including or excluding ambient audio captured proximate the location 400 during the recording process, allowing the user 225 to dictate the nature of the recording. In various implementations, the audio device 10 includes a plurality of microphones (e.g., such as microphones 18, 24 or 356) configured to perform binaural recording of the localized audio message 350 proximate location 400. This binaural recording approach can provide an immersive audio depiction of the location 400 during the recording, and enhance the acoustic accuracy of the localized audio message 350 relative to a single-microphone recording.

In other cases, the user 225 or another user can initiate recording of the localized audio message 250 at a location 400b, 400c, etc. that is distinct from the location 400a associated with the message. In these cases, one user 225 could leave a localized audio message 250 for himself/herself to retrieve at the location 400a at a later time, or could leave this localized audio message 250 for another user to retrieve at the location 400a. For example, a user 225 could leave a localized audio message 250 including a grocery list at a grocery store so that the user 225 does not forget wanted items when he/she arrives at the store. Similarly, the user 225 could leave that localized audio message 250 including the grocery list at the grocery store for his/her spouse to "pick up" upon arrival in order to avoid forgetting wanted items.

In other examples, a user 225 could leave a localized audio message 250 recorded at the location 400 during a particular event for later retrieval, providing an immersive audio experience. For example, a user 225 could capture the excitement of a parade, the significance of a protest, or the danger of a hurricane by recording a localized audio message 250 on location 400 for later retrieval by the user 225 or other users. In still other examples, a user 225 could leave a series of localized audio messages 250 (locally recorded or remotely recorded) at points along a travel route for a friend or family member planning to traverse that route. In this sense, the recording user 225 could share portions of his/her experience with a distinct user at a later time. In yet other examples, a hospitality provider such as a bed-and-breakfast owner, could leave one or more localized audio messages 250 around a city for guests to discover along a walking, biking or other tour.

Additionally, as noted herein, the location-based audio engine 210 is configured to provide a prompt for feedback about the localized audio message 250 along with, or after playing the localized audio message 250. The prompt can include any prompt described herein, such as via a user interface or other interface (e.g., a user input interface on smart device 340), or may include an audio prompt (provided via speaker 28 with response capable via microphone 356 or microphones 18 or 24 (FIG. 1)) for feedback about the localized audio message 250. In various implementations, the feedback prompt can take the form of prompt 240 to initiate playback of the localized audio message 250, however, in other cases, the feedback prompt can provide for additional information to enhance the ability of location-based audio engine 210 to learn user preferences. In some cases, the feedback prompt can include at least one option to: a) refuse the localized audio message 250; b) select between distinct localized audio messages 250; c) rate the localized audio message 250; or d) save the localized audio message 250 for later.

In various embodiments, where the feedback prompt is an audio prompt, it can include a phrase such as "Did you enjoy this audio message?", or "Would you like to continue this audio stream?" Additionally, in some cases, the audio prompt can include one or more tones, or an audio beacon. Feedback prompt can include any spoken phrase, word or clause intended to elicit a response from user 225, or can include a displayed prompt (e.g., similar to audio phrase, or with a Yes/No/Maybe or other visual prompt with touchscreen or push-button response capabilities), such as a prompt displayed at smart device 340 or other device within range of user 225. In various implementations, feedback prompt can be provided to the user 225 without an intervening audio input from user 225, such that user 225 is not required to prompt location-based audio engine 210 (e.g., by using an initiation term such as a name) in order to provide feedback. That is, the control circuit 30 can maintain the microphone(s) 356 in a query mode during playback of the localized audio message 250 (and may do similarly with initial prompt 240), such that the system actively awaits a response from the user 225. In some implementations, microphone(s) 356 can remain in an optional response mode while providing the audio message 250 and/or feedback prompt. That is, control circuit 30 can maintain microphone(s) 356 in a listen mode for a set period, with an expectation that user 225 may or may not respond (e.g., with a "Thanks," compliment or other feedback 260 about localized audio message 250 and/or feedback prompt).

With continuing reference to FIGS. 2-4, according to various implementations, location-based audio engine 210 can further include feedback logic 290 for receiving and processing the feedback 260 from user 225 (processes 450, 460). In some cases, feedback 260 includes negative feedback from user 225 about the localized audio message 250 (e.g., "I don't like this audio message", "No", "Change", "Next" or a similar response to a user interface prompt such as a thumbs-down, "No" vote, etc.). In other cases, feedback 260 includes positive feedback from user 225 about the localized audio message 250 (e.g., "Yes", "Good", "Continue" or a similar response to a user interface prompt such as a thumbs-up, "Yes" vote, etc.). In various implementations, user 225 can provide either a verbal response or a response to a user interface prompt.

In some cases, feedback 260, or other audio inputs (e.g., sensor data 230) includes an audio signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio files 310 can include "text" metadata, which can allow location-based audio engine 210 to perform metadata feature extraction on audio file(s) 310. This metadata feature extraction can include, for example, matching and linking features to a database (e.g., audio library 300) and/or retrieving/analyzing additional audio and semantic attributes of the audio file(s) 310, e.g., genre, mood, themes or related artists. Location-based audio engine 210 (and logic therein) can use these acoustic features from feedback 260 or other audio inputs, and metadata features from audio files 260, to perform statistical and probabilistic modeling in order to recommend or select other similar localized audio messages 250 and/or recommend audio streams (e.g., radio stations, albums, playlists or artists) in accordance with other functions.

In response to the user 225 providing negative feedback about the localized audio message 250, location-based audio engine 210 is configured to continue playing the localized audio message 250 (process 450, FIG. 3), stop (halt) playing the localized audio message 250 (process 460) or revert to playing the previous audio file 310 (process 470, FIG. 3). This decision can be made by location-based audio engine 210 based upon the user profile 330 associated with user 225 or with other user settings. For example, as shown in FIG. 3, in some cases, where user 225 provides negative feedback about the localized audio message 250, location-based audio engine 210 may check user profile 330 to determine whether user has settings for stopping the audio feed (Set: Stop), settings for reverting to the previous audio file 310 (Set: Revert), or settings for continuing the localized audio message 250 (Set: Continue) in response to negative feedback. In some cases, a default setting could include reverting to the previous audio file 310 (process 470), unless no previous audio file was being played, in which case, stopping the audio feed.

In response to the user 225 providing positive feedback about the localized audio file 250, location-based audio engine 210 is configured to continue an audio feed of the localized audio file (process 450, FIG. 3). In various particular implementations, a positive response to the feedback prompt can include a null response (e.g., no verbal or other command from user 225) after a waiting period (e.g., 10 seconds, 20 seconds).

As shown in FIG. 2, feedback logic 290 is connected with sensor data processing logic 270 and can process feedback 260 and provide that feedback 260 to sensor data processing logic 270 and library lookup logic 280. In some cases, feedback logic 290 can be configured to teach sensor data processing logic 270 and library lookup logic 280 about preferences of user 225, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 290 can be configured to analyze feedback 260 and enhance future operations of location-based audio engine 210. It is further understood that feedback logic 290, library lookup logic 280 and/or sensor data processing logic 270 may be interconnected in such a manner that these components act in concert or in reliance upon one another.

As noted herein, in contrast to conventional audio systems, the personal audio device 10 disclosed according to various implementations can allow a user 225 to experience location-specific audio, creating an immersive experience particular to specific geographic locations. For example, as shown in FIG. 4, a user 225 can move between distinct locations 400a, 400b, 400c and 400d, while the user 225 experiences one or more prompts 240 to initiate localized audio message(s) 250, or beacons 255 to draw that user 225 toward localized audio message(s) 250. These prompts 240, localized audio messages and beacons 255 can vary across a plurality of locations 400a, 400b, 400c, 400d (e.g., changes with a transition between locations or actively provides the option to transition between localized audio messages 250 within the same geographic proximity). The following example is based in Boston, Mass.

In some implementations, location 400a could include a live sporting event, such as a baseball game at Fenway Park. One or more sensors (e.g., position tracking system 352, FIG. 2) could detect that user 225 is physically located within a baseball park during a baseball game (e.g., where game-time data is pulled by additional sensors or via Internet search or calendar data via smart device 340). Location-based audio engine 210 could provide a prompt 240 to the user 225 to initiate a localized audio message 250 that applies to Fenway Park, for example, an audio stream of the radio broadcast on a local sports network, as provided by that local sports network. Additionally, or alternatively, location-based audio engine 210 could provide a prompt 240 to initiate a localized audio message 250 provided by a vendor within the ballpark. The prompt 240 could be an audio prompt (e.g., "Would you like to hear offers from a nearby vendor of fast food?"). However, in some implementations, location-based audio engine 210 can utilize sensor data 230 to determine that ambient noise (e.g., crowd noise) is so significant that another type of prompt (e.g., visual or tactile) may be more effective, and may initiate a user interface prompt and/or vibration at the audio device 10 and/or smart device 340. If the user 225 actuates the prompt 240, the user 225 can hear the localized audio message 250, e.g., "Hot dogs are on sale at the vendor located near Gate D." As described herein, the localized audio message 250 may be played at a decibel level such that user 225 has the ability to hear the audio stream relative to the surrounding noise (e.g., as detected by microphone 356, or microphone(s) 18 or 24 (FIG. 1)), and may be played at a decibel level intended not to overwhelm the live experience, that is, without interfering with the ambient audio at the baseball game. User 225 can pre-define this decibel level (e.g., in profile 330), or may adjust this decibel level dynamically using any control device described herein. It is understood that other providers could leave localized audio messages 250 proximate the first location 400a, such as baseball players leaving messages describing their favorite moments on the field, or other fans and/or friends leaving messages describing their experiences at Fenway Park. Additionally, the Boston Red Sox® baseball organization (trademark owned by the Boston Red Sox Baseball Club Limited Partnership, of Boston, Mass.) could leave audio messages 250 replaying the in-stadium audio experience during landmark events, such as a playoff victory.

As the game concludes, user 225 walks out of the baseball park and into another location 400b adjacent the baseball park (e.g., onto a street such as Yawkey Way). Sensor system 36 may detect (e.g., via position tracking system 352 and/or accelerometer/gyroscope 354) that user 225 is picking up pace and walking quickly, and send corresponding sensor data 230 to location-based audio engine 210. Additionally, location-based audio engine 210 could infer, based on the user's prior habits that the user is walking towards a particular location (e.g., location 400c). The location-based audio engine 210 may process this sensor data 230 and select a beacon 255 located outside of the geographic location 400b, but nearby (e.g., within a beacon radius of the location 400b, such as in Kenmore Square or proximate the Prudential Center) and in the direction of the user's movement. The location-based audio engine 210 can provide that beacon 255 to the user 225 in the form of an audio stream (audio file 310). The beacon 255 could include a song or other audio feed from the user's favorite performer (e.g., Taylor Swift or Bruno Mars) as determined based upon the user profile 330 and/or a subscription/following model from a linked social media account on smart device 340, and can draw the user 225 to another geographic location (e.g., location 400c) such as a concert hall where the performer is currently playing or scheduled to play in the near future. In some example implementations, the beacon 255 can include audio that indicates (or "signals") to the user 225 that a localized audio message 250 is present at a distinct location (e.g., location 400c). In these cases, the beacon 255 can indicate a characteristic of the localized audio message 250, such as that the message was left by a particular person or entity, or that the message is related to a particular topic or characteristic associated with the location. For example, a musician or celebrity such as Taylor Swift could leave a localized audio message 250 at a location (e.g., location 400c), and the beacon 255 associated with that message could include one of Ms. Swift's songs. In other examples, a beacon 255 could play contextual audio to draw the user 225 toward the location. For instance, a beacon 255 associated with a location (e.g., location 400c) having a notable ethnic characteristic (e.g., Boston's North End) can include music associated with that characteristic (e.g., Italian music). As the user 225 moves (e.g., walks, bicycles, or rides) toward the beacon 255, the intensity and/or decibel level of the audio file 310 can be increased to draw the user 225 toward the beacon 255.

When the user 225 arrives at the location of the beacon 255 (e.g., location 400c), location-based audio engine 210 can provide a prompt 240 to initiate playback of an audio message 250 from the performer (e.g., "I am playing a concert tomorrow night at the Concert Venue, and hope you can join me"). At location 400c, the user 225 could receive one or more prompts 240 from the Concert Venue to play localized audio messages 250 indicating an availability of seats for the concert, time/duration details of the concert, or links to one or more box office options for purchasing tickets. Additionally, or alternatively (e.g., based upon user profile settings), user 225 can receive prompts 240 for localized audio messages 250 at location 400c from friends or other relations in a social media network describing their experiences at the Concert Venue (e.g., "Choose a seat in the balcony—they are a great value," or "Avoid the front rows unless you like crowds").

User 225 can leave location 400c and walk, bike or ride toward another part of town, e.g., Boston's North End neighborhood in location 400d. In this example, the user 225 is visiting Boston from out of town, and is staying at a local bed-and breakfast. At location 400d, the user 225 can receive one or more prompts 240 to initiate a localized audio message 250 as the user 225 walks down Hanover Street. In some cases, these localized audio messages 250 are provided by the proprietor of the bed-and-breakfast, and are located at one or more coffee shops, pastry shops or pizzerias along the street. Some of these localized audio messages 250 can include recordings of audio captured at that location, e.g., by the proprietor, at an earlier time. For example, the proprietor may leave a series of localized audio messages 250 (or, pins) along a walking path such as the Freedom Trail to provide an enhanced walking tour for his/her guests. These pins could include anecdotes about the proprietor's experience at these sites (e.g., "Try a cannoli at Mike's Pastry, but avoid the lines between 6 pm-10 pm," or "I enjoy a cup of coffee at Nero every Saturday evening after dinner—you may particularly like their espresso," or "I like to walk to the Harbor from Hanover Street first thing in the morning and see the North End park").

In additional implementations the location-based audio engine 210 can be configured to prioritize playback of localized audio messages 250 according to a number of parameters. For example, localized audio messages 250 (and related prompts 240 and/or beacons 255) can be prioritized based upon the user's network, e.g., where messages 250 from other user(s) 225 within the subject user's network(s) are given priority over messages 250 from other users 225 or entities not included in that network. Additionally, the type of localized audio message 250 can form the basis for prioritization and/or filtering, such as prioritizing localized audio messages 250 from friends or other network members over localized audio messages 250 provided by commercial entities. Even further, the popularity of the localized audio message 250 (e.g., within a given network of the user 225 or generally) could form the basis for prioritization and/or filtering, such as prioritizing localized audio messages 250 that are most frequently triggered by other users 225.

Additionally, localized audio messages 250 could be prioritized or designated as "primary" messages within a given area. The location-based audio engine 210 could analyze localized audio messages 250 in an area and designate certain of those messages 250 as "must-listen" or otherwise highlighted messages, e.g., based upon popularity with other users 225 and/or other profile characteristics of the user 225. While primary messages can be designated, additional (e.g., secondary) messages can also be designated proximate the primary messages. In some cases, beacons 255 can be used to guide the user 225 to and/or between primary localized audio messages 250, while beacons 255 are not used to indicate secondary (or lower priority) messages. The prioritization of these localized audio messages can be based upon the user profile 330, other user settings, machine learning (e.g., using an artificial intelligence engine at location-based audio engine 210), and/or crowd-sourcing.

These additional functions of the location-based audio engine 210 can provide users 225 with personalized travel and/or sightseeing experiences. That is, based upon user characteristics (e.g., user profile 330) or other learned parameters, the location-based audio engine 210 can tailor localized audio messages 250 (and associated prompts 240 and beacons 255) for each user 225.

As noted herein, the user 225 can define the providers he/she follows, and the radius of proximity for receiving prompts 240 or beacons 255. Additionally, as noted herein, the location-based audio engine 210 can provide an immersive experience whereby a user 225 subscribes for a period (or a trip) to a single message provider. This scenario may be particularly useful for a tour, where the user 225 walks, bikes or rides (e.g., as lead by beacons 255 or instructions in localized audio messages 250) between locations 400. In this example, the exclusive subscription/following period may allow the user 225 to focus only on localized audio messages 250 from a desired provider.

In this sense, user 225 traverses multiple locations with access to a variety of localized audio messages, providing an immersive audio experience at each location. Because the user 225 is not required to prompt location-based audio engine 210 to indicate the availability of localized audio messages 250, the user 225 can focus on additional stimuli in the surrounding environments, and enjoy enhanced audio experiences at distinct locations.

The above-noted example process provides several location-based examples of changes in environments, however, as noted herein, the defined "proximity" to a particular location can be modified according to user and/or system settings. For example, particular localized audio messages 250 (and their associated prompts 240 or beacons 255) can be set to a smaller radius (e.g., 10-15 feet) in order to avoid over-stimulation of prompts 240 in a dense area. Additionally, the proximity threshold can be increased (e.g., 100-150 feet) in less dense areas. While particular types of sensors, and modes of operation (e.g., active v. passive detection) may be more practicable than others with given hardware constraints (e.g., in a personal audio device 10), it is understood that any sensor described herein can be employed by sensor system 36 to detect a change in location and/or environmental condition around user 225.

In still further implementations, the localized audio message 250 can include distinct directionally attributable segments based upon a direction of approach relative to the location 400 (e.g., a direction from which the personal audio device 10 approaches the location 400). In these cases, the localized audio message 250 can include a plurality of messages 250, e.g., distinct audio files or audio streams or sub-files/streams that are available for playback based upon the user's direction of approach relative to the location 400. In example implementations, a location 400 can have two, three or four directionally attributable segments. That is, the same user 225 can approach the same location 400 from a distinct direction (e.g., from north as opposed to west), and be prompted to play a distinct localized audio message 250 based upon that direction of approach. In some cases, corresponding distinct directionally attributable prompts 240 are associated with the localized audio message(s) 250, e.g., based upon the user's direction of approach. This approach direction methodology can be useful in providing a localized audio message 250 that is relevant to the user's direction of motion. For example, where the user 225 approaches a location 400 from the west, it can be inferred that the user 225 intends to continue moving eastward, or at least, that the user 225 is generally looking in the eastward direction.

The location-based audio engine 210 can detect the direction of approach (e.g., via sensor system 36), and provide a directionally attributable prompt 240 and/or a directionally attributable localized audio message 250 specific to a user 225 approaching from a directional range (e.g., approximately southwest to approximately northwest, or a range of degree variation from a direction). In some cases, the prompt 240 and/or message 250 can include a directionally attributable segment having information about a point of interest that is generally in front of the user 225 moving in that direction. For example, the prompt 240 can include a directionally attributable segment including an audio message such as "double-tap to hear a message from the Boston Red Sox, whose home field is Fenway Park, 100 yards ahead of you in your current direction." In response to user actuation of the prompt 240, the location-based audio engine 210 can play a directionally attributable segment of the localized audio message 250 that is specific to the approach direction of user 225, e.g., "you are walking toward the Green Monster, Fenway Park's famed outfield wall."

The same localized audio message 250 (and/or prompt 240) can have distinct directionally attributable segments. For example, in the example of a location 400 proximate Fenway Park, the localized audio message 250 can include a distinct directionally attributable segment that relates to users approaching the location 400 from the east (moving westward). In these cases, the directionally attributable segment of the prompt 240 can prompt the user to hear a localized audio message 250 about nearby Boston University, e.g., "nod to hear a message from the president of Boston University about the neighborhood." In response to user actuation of this prompt 240, the location-based audio engine 210 can play a directionally attributable segment of the localized audio message 250 that is specific to the approach direction of user 225, e.g., "you are walking toward Boston University's campus center, which is approximately three blocks ahead on your right-hand side."

Additionally, or alternatively, the distinct directionally attributable segments of the prompt 240 and/or localized audio message 250 can be based upon a look direction of the user 225 wearing the audio device 10. For example, where a user 225 looks eastward, westward, up, down, etc. the prompt 240 and/or localized audio message 250 can play back a distinct audio segment at the same location 400. In these cases, the location-based audio engine 210 can retrieve information about the user's look direction at or proximate location 400 from the orientation tracking system (e.g., a head tracking system including a magnetometer), and based upon that retrieved information, can provide a directionally attributable segment (e.g., prompt 240 and/or localized audio message 250) as playback at the audio device 10. Similarly to inferring the direction which the user 225 is looking based upon approach direction, the location-based audio engine 210 can provide a prompt 240 to the user 225 to play to a localized audio message 250 based upon the detected look direction of the audio device 10. For example, where a user 225 is standing in Boston's Public Garden and the orientation tracking system indicates that the user 225 is looking west, the location-based audio engine 210 can provide a prompt 240 to the user 225 such as, "nod to play a message about the Back Bay neighborhood." In response to user actuation of this prompt 240, the location-based audio engine 210 can play a directionally attributable segment of the localized audio message 250 that is specific to the look direction of user 225, e.g., "you are looking at Boston's famed Commonwealth Avenue Mall." In another example, where the user 225 is standing at the same location 400 in Boston's Public Garden and the orientation tracking system indicates that the user 225 is looking east, the location-based audio engine 210 can provide a prompt 240 to the user 225 such as, "speak to play a message about the Boston Common." In response to user actuation of this prompt 240, the location-based audio engine 210 can play a directionally attributable segment of the localized audio message 250 that is specific to the look direction of user 225, e.g., "you are looking at the Boston Common, and beyond it, the Financial District." Similarly, prompts 240 and/or localized audio messages 250 can be segmented for looking up/down, e.g., looking upward at a monument or notable building, or looking down from an elevation (e.g., an airplane, or an upper floor in a building).

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a wearable audio device configured to provide an audio output, the wearable audio device comprising: a sensor system comprising a microphone; and a position tracking system configured to detect a position of the wearable audio device, the method comprising: (receiving data indicating the wearable audio device is proximate a geographic location associated with a localized audio message;

receiving position data from the position tracking system indicating the wearable audio device is proximate a geographic location associated with a localized audio message;

providing a prompt to initiate playback of the localized audio message to a user of the wearable audio device; and initiating playback of the localized audio message at the wearable audio device in response to actuation of the prompt by the user, wherein the localized audio message is only accessible proximate the geographic location, wherein accessible proximity to the geographic location is adjustable based upon a density of a geographic region, the density of the geographic region comprising: a localized audio message density of the geographic region as defined by a number of localized audio messages associated with the geographic region, and wherein accessible proximity to the geographic location is further adjustable based upon user profile settings for at least one of the user or a provider of the localized audio message, wherein the accessible proximity is lesser for a geographic region with a higher density than for a geographic region with a lower density, wherein the localized audio message is stored in a local network at the geographic location or in a cloud storage system connected with the geographic location.

2. The computer-implemented method of claim 1, wherein:

a) the sensor system further comprises a position tracking system, wherein the method further comprises:
   selecting the prompt to initiate playback of the localized audio message based upon a position and direction of movement of the wearable audio device; and
   providing at least one additional prompt to initiate playback of a distinct localized audio message based upon a change in the position or the direction of movement of the wearable audio device,
   wherein the position tracking system comprises at least one of a global positioning system or an orientation tracking system, and wherein the prompt or the at least one additional prompt is selected based upon at least one of positioning data from the global positioning system or orientation data from the orientation tracking system, and b) the sensor system further comprises at least one of an accelerometer or a gyroscope, wherein the method further comprises:
   selecting the prompt to initiate playback of the localized audio message or providing an audio beacon indicating a direction of a distinct localized audio message based upon an acceleration of the wearable audio device or a deceleration of the wearable audio device.

3. The computer-implemented method of claim 1, further comprising initiating playback of an audio beacon associated with the localized audio message based upon at least one of a position or an orientation of the wearable audio device, wherein the audio beacon is spatialized to indicate at least one of a direction or a proximity of the geographic location associated with the localized audio message, wherein playback of the audio beacon is performed prior to providing the prompt to initiate playback of the localized audio message.

4. The computer-implemented method of claim 1, further comprising initiating playback of an audio beacon associated with the localized audio message based upon at least one of a position or an orientation of the wearable audio device, wherein the audio beacon is spatialized to indicate at least one of a direction or a proximity of the geographic location associated with the localized audio message, wherein the spatialized audio beacon adjusts at least one audio characteristic thereof based upon a change in the at least one of the position or the orientation of the wearable audio device, the method further comprising:
   initiating playback of an additional audio beacon associated with an additional localized audio message based upon the change in the at least one of the position or orientation of the wearable audio device,
   wherein the additional audio beacon is initiated in a series following initiation of the audio beacon and the localized audio message.

5. The computer-implemented method of claim 1, wherein the prompt comprises at least one of an audio prompt provided at the wearable audio device, or a visual prompt or a tactile prompt provided at the wearable audio device or at a distinct device on the user, and
   wherein actuation of the prompt is detectable by the wearable audio device and comprises at least one of a gesture of the user, a tactile actuation by the user or a voice actuation by the user.

6. The computer-implemented method of claim 1, further comprising:
   prompting the user or another user to record the localized audio message;
   saving the localized audio message to a storage device accessible at the wearable audio device after recording the localized audio message; and
   initiating, by the user or another user at the wearable audio device or another audio recording device, a recording of the localized audio message while the user or another user is at a location remote from the geographic location.

7. The computer-implemented method of claim 1, further comprising:
   prompting the user or another user to record the localized audio message;
   saving the localized audio message to a storage device accessible at the wearable audio device after recording the localized audio message;
   initiating, by the user or another user at the wearable audio device or another audio recording device, a recording of the localized audio message while the user or another user is proximate the geographic location; and
   providing a user-selectable setting to either include or exclude ambient audio captured proximate the geographic location during the recording,
   wherein the wearable audio device comprises a plurality of microphones configured to perform binaural recording of the localized audio message proximate the geographic location.

8. The computer-implemented method of claim 1, further comprising receiving user profile data or biometric information about the user, and wherein providing the prompt to initiate playback of the localized audio message is based upon at least one of the user profile data or the biometric information about the user,
   wherein the user profile data comprises settings for audio notifications at the wearable audio device, and wherein at least one of providing the prompt or initiating the playback at the wearable audio device is performed according to the settings.

9. The computer-implemented method of claim 1, further comprising providing a feedback prompt during the playback of the localized audio message or after the playback of the localized audio message, the feedback prompt comprising at least one option to: refuse the localized audio message, select between distinct localized audio messages, or rate the localized audio message.

10. The computer-implemented method of claim 1, wherein the user is permitted to share the localized audio message with a distinct user located at the geographic location or located at a remote geographic location.

11. The computer-implemented method of claim 1, wherein the localized audio message is only accessible for a specified period, wherein the specified period is one of a single period or a recurring period.

12. The computer-implemented method of claim 1, wherein the localized audio message comprises distinct directionally attributable segments based upon at least one of a direction of approach of the wearable audio device relative to the geographic location or a look direction of the user wearing the wearable audio device, wherein each of the distinct directionally attributable segments is associated with a same localized audio message.

13. A wearable audio device comprising:
an acoustic transducer having a sound-radiating surface for providing an audio output;
a position tracking system configured to detect a position of the wearable audio device; and
a control system coupled with the acoustic transducer and the position tracking system, the control system configured to:
receive position data from the position tracking system indicating the wearable audio device is proximate a geographic location associated with a localized audio message;
provide a prompt to initiate playback of the localized audio message to a user of the wearable audio device; and
initiate playback of the localized audio message at the wearable audio device in response to actuation of the prompt by the user,
wherein the localized audio message is only accessible proximate the geographic location, wherein accessible proximity to the geographic location is adjustable based upon a density of a geographic region, the density of the geographic region comprising: at least one of a localized audio message density of the geographic region as defined by a number of localized audio messages associated with the geographic region,
wherein accessible proximity to the geographic location is further adjustable based upon user profile settings for at least one of the user or a provider of the localized audio message, wherein the accessible proximity is lesser for a geographic region with a higher density than for a geographic region with a lower density, wherein the localized audio message is stored in a local network at the geographic location or in a cloud storage system connected with the geographic location.

14. The device of claim 13, wherein the control system is further configured to:
select the prompt to initiate playback of the localized audio message based upon a position and direction of movement of the wearable audio device; and
provide at least one additional prompt to initiate playback of a distinct localized audio message based upon a change in the position or the direction of movement of the wearable audio device,
wherein the position tracking system comprises at least one of a global positioning system or an orientation tracking system, and wherein the prompt or the at least one additional prompt is selected based upon at least one of positioning data from the global positioning system or orientation data from the orientation tracking system.

15. The device of claim 13, wherein the position tracking system comprises an orientation tracking system comprising a head tracking system, and wherein the providing of the prompt to initiate playback of the localized audio message is based at least partially on a head position of a user detected by the head tracking system.

16. The device of claim 13, further comprising a sensor system coupled with the control system, wherein:
a) the sensor system comprises a wireless transceiver configured to detect an audio cache storing the localized audio message proximate the wearable audio device, and the control system is further configured to provide the prompt to initiate playback of the localized audio message in response to the wireless transceiver detecting the audio cache, and wherein the audio cache is stored in the local network at the geographic location or in the cloud storage system connected with the geographic location,
b) the sensor system comprises a motion sensor; a tactile sensor; and a microphone, wherein actuation of the prompt is detectable by the sensor system, and wherein actuation comprises at least one of a gesture of the user detectable by the motion sensor, a tactile actuation by the user detectable at the tactile sensor, or a voice actuation by the user detectable by the microphone,
c) the sensor system comprises at least one of an accelerometer or a gyroscope, wherein the control system is further configured to: select the prompt to initiate playback of the localized audio message or provide an audio beacon indicating a direction of a distinct localized audio message based upon an acceleration of the wearable audio device or a deceleration of the wearable audio device, or
d) the sensor system comprises a microphone, wherein the control system is further configured to: detect an ambient audio signal proximate the wearable audio device via the microphone; and modify the localized audio message at the wearable audio device based upon the ambient audio signal, wherein detecting the ambient audio signal comprises identifying a signature of the ambient audio signal, and wherein modifying the localized audio message comprises at least one of increasing a decibel level of the localized audio message, decreasing the decibel level of the localized audio message, or providing an active noise reduction signal at the wearable audio device, based upon the identified signature of the ambient audio signal.

17. The device of claim 13, wherein the control system is further configured to initiate playback of an audio beacon associated with the localized audio message based upon at least one of a position or an orientation of the wearable audio device, wherein the audio beacon is spatialized to indicate at least one of a direction or a proximity of the geographic location associated with the localized audio message,
wherein playback of the audio beacon is performed prior to providing the prompt to initiate playback of the localized audio message, wherein the spatialized audio beacon adjusts at least one audio characteristic thereof based upon a change in the at least one of the position or the orientation of the wearable audio device, wherein the control system is further configured to initiate playback of an additional audio beacon associated with an additional localized audio message based upon the change in the at least one of the position or orientation of the wearable audio device, and
wherein the additional audio beacon is initiated in a series following initiation of the audio beacon and the localized audio message.

18. The device of claim 13, wherein the localized audio message comprises a song, a pre-recorded message from the user or another user, an audio signature from the user, another user or an information source, or a pre-recorded message from the information source, wherein the prompt comprises at least one of an audio prompt provided at the acoustic transducer, or a visual prompt or a tactile prompt provided at the wearable audio device or at a distinct device on the user.

19. The device of claim 13, wherein the control system is further configured to:
   prompt the user or another user to record the localized audio message;
   save the localized audio message to a storage device accessible at the wearable audio device after recording the localized audio message; and
   initiate, in response to actuation by the user or another user at the wearable audio device or another audio recording device, a recording of the localized audio message while the user or another user is at a location remote from the geographic location.

20. The device of claim 13, wherein the control system is further configured to:
   prompt the user or another user to record the localized audio message;
   save the localized audio message to a storage device accessible at the wearable audio device after recording the localized audio message; and
   initiate, in response to actuation by the user or another user at the wearable audio device or another audio recording device, a recording of the localized audio message while the user or another user is proximate the geographic location; and
   provide a user-selectable setting to either include or exclude ambient audio captured proximate the geographic location during the recording,
the device further comprising: a plurality of microphones coupled with the control system, the plurality of microphones configured to perform binaural recording of the localized audio message proximate the geographic location.

21. The device of claim 13, wherein the control system is further configured to:
   receive user profile data or biometric information about the user,
   wherein providing the prompt to initiate playback of the localized audio message is based upon at least one of the user profile data or the biometric information about the user, and
   wherein the user profile data comprises settings for audio notifications at the acoustic transducer, and wherein at least one of providing the prompt or initiating the playback at the acoustic transducer is performed according to the settings.

22. The device of claim 13, further comprising providing a feedback prompt during the playback of the localized audio message or after the playback of the localized audio message, the feedback prompt comprising at least one option to: refuse the localized audio message, select between distinct localized audio messages, or rate the localized audio message, and
   wherein the user is permitted to share the localized audio message with a distinct user located at the geographic location or located at a remote geographic location.

23. The device of claim 13, wherein the localized audio message comprises distinct directionally attributable segments based upon at least one of a direction of approach of the wearable audio device relative to the geographic location or a look direction of the user wearing the wearable audio device.

* * * * *